July 7, 1942.  W. B. SIMONS  2,288,652

DECORTICATING MACHINE

Filed Jan. 6, 1941  2 Sheets-Sheet 1

INVENTOR
Walter B. Simons
BY
John S. Powers
ATTORNEY

July 7, 1942. W. B. SIMONS 2,288,652
DECORTICATING MACHINE
Filed Jan. 6, 1941 2 Sheets-Sheet 2
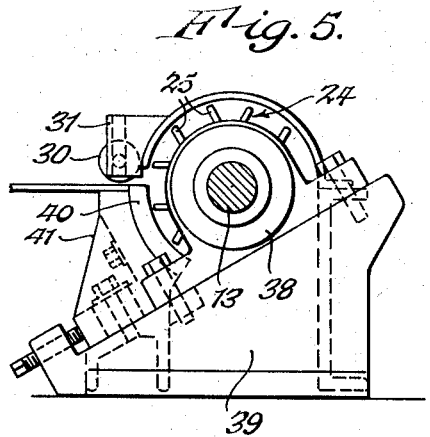
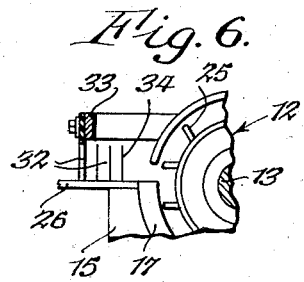
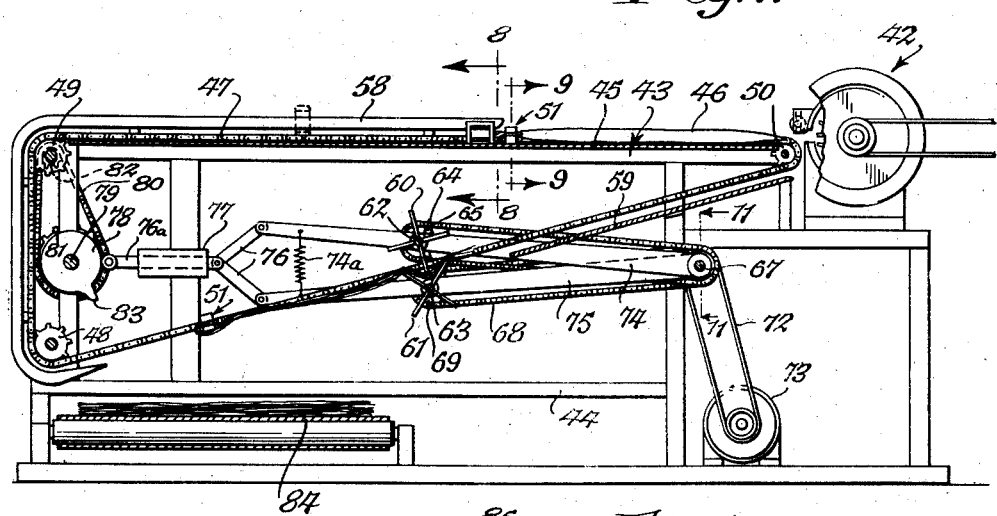
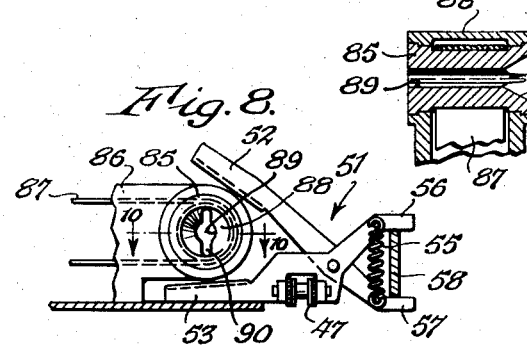
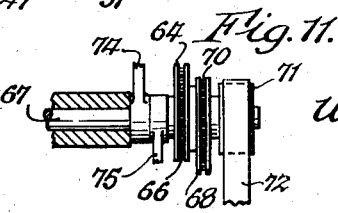
INVENTOR
Walter B. Simons
BY
John S. Powers
ATTORNEY Patented July 7, 1942

2,288,652

UNITED STATES PATENT OFFICE 2,288,652

DECORTICATING MACHINE

Walter B. Simons, Buffalo, N. Y.

Application January 6, 1941, Serial No. 373,203

7 Claims. (Cl. 19—27)

This invention relates to machines for processing the leaves and other parts of sisal, Sansevieria, banana and similar plants to isolate the fiber in its natural state and more particularly the invention is concerned with improvements in decorticating machines of the kind wherein the plant parts are moved lengthwise, first in one direction and then in the other, between a rasping plate and a bladed roll to effect the removal of the fibers of the pulp and other non-fibrous materials.

One object of the invention is to provide a machine which is so designed that in the processing of the plant parts the fibers are cleaned thoroughly and rapidly without waste and without being weakened or otherwise injured.

A further object is to provide a machine which, although small in size and readily portable, will have a large capacity, this object contemplating a construction which will permit two or more operators to work at the machine at the same time without interfering with one another.

A still further object is a machine in which provision is made for preventing the spraying upon the operator, or operators, of the juices which are liberated as an incident to the operation of the machine.

A still further object is to provide for facility in adjusting the machine to adapt it to different kinds of plants and to compensate for wearing of the parts.

The invention is illustrated in the accompanying drawings in which:

Figure 5 is a side elevation of a modified form of machine.

Figure 6 is a fragmentary view of another form of machine.

Figure 7 is a side elevation of still another form of machine.

Figures 8 and 9 are enlarged fragmentary sections taken along lines 8—8 and 9—9, respectively, of Figure 7.

Figure 10 is a detail section taken along line 10—10 of Figure 8.

Figure 11 is a similar section taken along line 11—11 of Figure 7.

Figure 12 is a fragmentary view of a leaf showing the manner in which the threads of a rasped end are twisted into a stem preparatory to being inserted between the jaws of the gripping element which is to advance the leaf through the machine.

Figure 1:
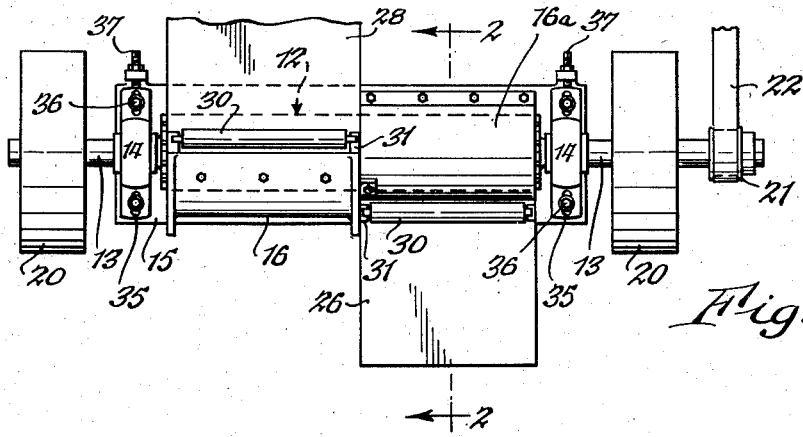
Figure 1 is a top view of a machine embodying the features of the invention.
Figure 2:
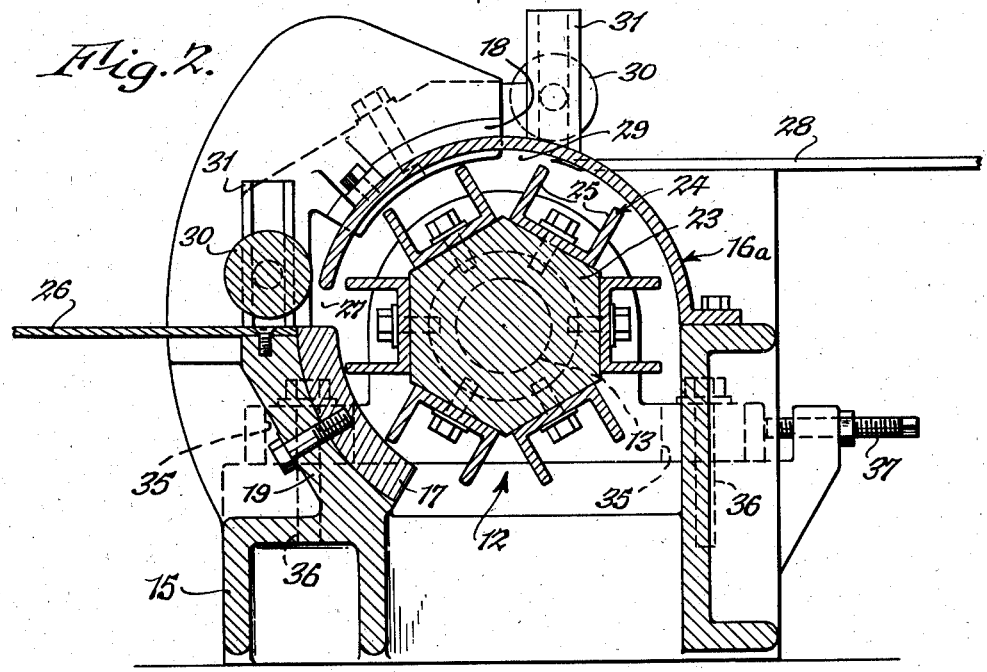
Figure 2 is an enlarged vertical section taken along line 2—2 of Figure 1.

The machine, as illustrated, in Figures 1 and 2, includes an elongated bladed rasping roll 12, the top wall of the working chamber for the roll being provided by a pair of cover sections 16 and 16a arranged end-to-end in abutting relation. The journals 13 of the roll are mounted in bearings 14 which are carried at the opposite ends of a base casting 15 and support the roll in the desired relation with respect to rasping plates 17 and 18. The former is mounted upon a front wall 19 of the base casting at one end and in front of the roll and the latter is supported over and at the opposite end of the roll, the said plates having an angular arrangement about the axis of the roll such that a radial plane touching the leading edge of one is substantially normal with respect to a similar plane touching the leading edge of the other. Extensions of the journals 13 preferably carry flywheels 20 and one of them also carries a pulley 21 which may be connected by a belt 22 to the drive pulley of a suitable motor.

The body 23 of the rasping roll is multi-sided. As illustrated, it is hexagonal and each side thereof carries a channel member 24, the flanges of the latter providing blades 25 which have slightly rounded edges, which occupy parallel planes and which extend at right angles with respect to the side of the roll to which the member is secured. The rasping roll is mounted so that the spaces between the edges of the blades 25 and the rasping plates, which will ordinarily be of the order of a few thousandths of an inch, are predetermined to provide just enough clearance to accommodate the fibers which are to be isolated. The leaves or other fiber containing plant parts which are to be passed between the roll 12 and the rasping plate 17 are arranged lengthwise upon a table 26 and introduced into the housing 16 through an opening 27 which preferably extends the full length of the cover section 16a, the upper surface of the table occupying the same horizontal plane as the upper edge of the rasping plate and the axis of the roll. The plant parts which are to be passed between the roll and the rasping plate 18 are arranged in the same manner upon a table 28, which is located at the opposite side and end of the machine, and are introduced into the housing through an opening 29 which preferably extends the full length of the cover section 16, the upper surface of the table in this instance, although horizontal, being substantially tangential to the path of the blades 25, being normal to the vertical plane occupied by the leading edge of the plate 18 and the axis of the roll 12 and being located at a higher elevation than the corresponding surface of the table 26. In order to prevent the escape from the housing of the plant juices which are liberated in the form of a spray, rollers 30 are preferably mounted in front of the openings 27 and 29. The rollers are freely rotatable, are provided with journals which extend into vertical guides 31 and ride over the plant parts which are introduced into the machine, the guides permitting the rollers to raise and lower in accordance with the thickness of the plant parts to prevent any of the juice mist or spray from being thrown in the direction of the operators who stand in front of or alongside the tables 26 and 28.

In the machine shown in Figure 6 the escape of the juice mist or spray into the surrounding atmosphere is prevented by a curtain 32 of rubber or any other suitable material, the said curtain being suspended from a frame 33 which is supported above and over the table 26. To facilitate entry of the plant parts into the machine, the curtain is preferably slit, as indicated at 34, to form separate strips which may move aside to provide a passage of the required width.

A plant part to be processed is preferably held by the point end and fed lengthwise (butt end first) into the machine and then withdrawn to thereby rasp the butt end, the movement of the butt end into the machine being in the direction of, and hence being aided by, the rotation of the rasping roll and its withdrawal movement being counter to the direction of, and hence being opposed by, the rotation of the said roll. The rasped butt end of the plant part is then grasped and the point end is inserted into and withdrawn from the machine in the same manner, the distance which the butt and point ends of the plant part are permitted to enter the machine being regulated so that in the two operations described the plant part will be rasped throughout its entire length.

It is to be noted that as the openings 27 and 29 are offset laterally the plant parts inserted by an operator at one side of the machine will not become entangled with the plant parts inserted by an operator at the opposite side of the machine even though the plant parts are inserted into the machine simultaneously from the opposite sides. It is to be understood, however, that the said openings and the tables associated with them may extend the full length of the rasping roll if this is desired and that the plant parts may be inserted from both sides of the machine without interference. In such a construction one or more operators may work at each side of the machine, the operator, or operators, at one side of the machine rasping the butt ends of the plant parts and then passing the latter directly across the machine to the operator, or operators, on the opposite side who may thereupon rasp the point ends. The necessity of turning the plant parts end for end after the butts have been rasped is thus avoided. This mode of procedure may also be followed, if desired, when the openings 27 and 29 and the associated tables are offset as illustrated in Figures 1 and 2 and has the advantage that it enables the clearance between the roll 12 and the rasping plate 17 to be predetermined with reference to the thicker butt ends of the plant parts and the clearance between the said roll and the rasping plate 18 to be predetermined with reference to the thinner point ends, the clearance between the roll and the plate 17, therefore, preferably being suitably greater than that between the roll and the plate 18. Uniform and effective removal of the pulp from the fibers despite the difference in thickness between the butt and point ends of the plant parts is thus insured.

Figure 3:
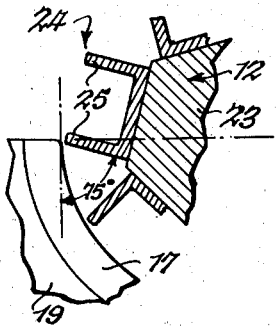
Figures 3 and 4 are fragmentary sections taken along the same line as Figure 2 showing different angular positions of the bladed roll with respect to one of the rasping plates.
Figure 4:
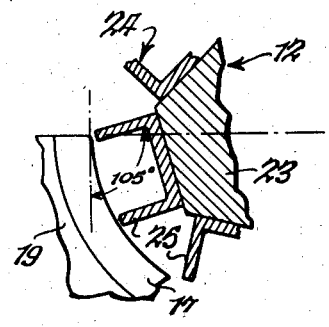

The rasping roll is driven at a high speed and as a plant part is introduced into the machine in the manner described the pulp and other solid materials adhering to the fibers are crushed and scraped from them, the blades 25 acting progressively upon the succeeding portions of the plant part at a rate determined by the rate at which the said part is permitted to enter the machine. Referring to Figure 2 it will be noted that the two blades 25 of each channel member 24 are parallel but non-radial and that when each of said members occupies a position opposite the opening 27 with the blades located equal distances above and below the plane of the upper edge of the rasping plate 17 and the axis of the roll 12 they are horizontal. As a result when the leading blade of each channel member first engages a plant part it forms an acute angle of substantially 75° with respect to a vertical plane touching the leading edge of the working face of the rasping plate (see Figure 3), whereas when the trailing blade first engages the plant part it forms an obtuse angle of substantially 105° with respect to a vertical plane touching the leading edge of the working face of the rasping plate (see Figure 4). Hence, although all blades to a certain degree have both a crushing and scraping action, the leading blade of each channel member functions primarily to crush the pulp while the trailing blade functions primarily to scrape the fibers. In this connection it will be noted that the blades 25 cooperate in the same manner with the rasping plate 18 despite the fact that in the latter instance the plant parts enter the machine tangentially, instead of at right angles, with respect to the path of the blades. It is understood, of course, that substantially all of the crushing of the pulp occurs during the movement of the plant parts into the machine and that during the withdrawal of the said parts all of the blades act primarily as scrapers to remove any pulp which may still adhere to the fibers.

In the embodiment of the invention shown in Figures 1 and 2, the bearing blocks 14 are formed with slots 35 for accommodating bolts 36 which secure the blocks to the base casting, the slots 35 providing for the adjustment of the rasping roll in a horizontal plane to vary the clearance between the blades of the roll and the rasping plates and to compensate for wearing of the parts. Adjusting screws 37, which are carried by the base casting, engage the backs of the bearing blocks and are available to advance the roll 12 toward the rasping plates and serve as stops to prevent accidental or unintentional movement of the roll away from the rasping plates.

A modified form of machine is shown in Figure 5 wherein the bearing blocks 38 for the rasping roll are mounted upon end walls 39 of the base casting which are inclined at an angle of approximately 30° with respect to the horizontal. In this embodiment a rasping plate 40 is carried by a holder 41 which is supported on the base casting at substantially the same angle as the bearing blocks 38 so that it may be adjusted to move the rasping plate in either direction along a radial line common to it and the roll.

In the various embodiments heretofore described it is assumed that the plant parts are to be introduced into and withdrawn from the machines manually. In the machine shown in Figure 7, however, it is intended that these operations be carried out mechanically and to this end the machine, indicated generally at 42, is mounted at one end of a table 43. The latter is carried by a framework 44 and the top 45 thereof is adapted to support the leaves 46 or other plant parts which are to be processed. The leaves 46, as illustrated, are advanced along the table by a chain 47 which is supported by sprockets 48, 49 and 50 so that the upper run moves across the top of the table. One of the sprockets referred to may be driven in any suitable manner to cause the chain to move continuously across the table.

At spaced intervals the chain 47 carries transversely extending clamps 51. The jaws 52 and 53 of the latter have rounded interfitting teeth 54 (Figure 9) and are normally held closed by a spring 55 (Figure 8). They are, however, formed with tailpieces 56 and 57, respectively, which are connected by the springs 55 and which straddle a cam rail 58 as the clamps approach the lower end of the lower run of the chain. The cam rail acts against the tailpieces to open the jaws of the clamps and to hold them open during movement of the clamps partway across the top of the table. As each clamp approaches the upper end of the cam rail the butt end of a leaf or other plant part which has previously been rasped is inserted between its jaws. Hence as the clamp moves beyond the cam rail the tailpieces 56 and 57 are released and the jaws are permitted to close upon the rasped end of the leaf. The clamp is thereupon operative to advance the leaf lengthwise to move the free end between the rasping roll and plate of the machine 42 to isolate the fiber component in the manner described, the leaf being withdrawn from between the rasping roll and plate as that portion of the chain which carries the clamp passes around the sprocket 50 and moves toward the lower sprocket 48. As the leaf emerges from between the rasping roll and plate it moves down an inclined support 59 and is caused to pass between a pair of bladed wheels 60 and 61 which are carried by shafts 62 and 63, respectively. A chain 64 which drives the wheel 60 is carried by a sprocket 65 which is fixed to the shaft 62 and a sprocket 66 (Figure 11) which is fixed to a shaft 67 while a chain 68 which drives the wheel 61 is carried by a sprocket 69 which is fixed to the shaft 63 and a sprocket 70 which is fixed to the shaft 67, the shaft 67 also carrying a pulley 71 which is connected by a belt 72 to the drive pulley of a suitable motor 73. The blades of the wheels 60 and 61 mesh and are driven in time relation by the motor 73. They are operative as the fibers travel between them to subject the fibers to a light beating action and thereby separate them from one another, partially dry them and effect the removal of any pulp particles which may still cling to them.

The shafts of the wheels 60 and 61 are carried by arms 74 and 75, respectively, which are pivotally supported at their inner ends upon the shaft 67 and which are connected adjacent their outer ends by a spring 74a. Toggle links 76 connect the outer ends of the arms 74 and 75 to one end of a slide 76a which is carried by a block 77, the other end of the slide having a rolling engagement with a cam 78. The latter is fixed to a shaft 79 and is driven by a chain 80 which is carried by sprockets 81 and 82, one of which is carried by the shaft of the sprocket 49. An elevated portion 83 of the cam 78 is so formed and located that it operates the slide 76a to actuate the toggle links 76 against the action of the spring 74a, whereby to separate the wheels 60 and 61 as each clamp approaches them and hold them apart until passage of the clamp between them. As the clamps approach the lower end of the chain, after passage of the fibers of the plant parts between the wheels 60 and 61, their tailpieces move into engagement with the cam rail 58 and their jaws are opened. The fibers are thus released and permitted to fall upon a conveyer 84 which is adapted to carry them to a point from which they may be removed from the machine preparatory to the drying operations which are to follow.

As noted heretofore, it is preferred that the pulp be removed from the butt ends of the plant parts as a preliminary operation to the gripping of the butt ends by the clamps 51, whereby upon passage of the plant parts between the rasping roll and plate in the manner described the pulp will be removed from the remaining portions of the fibers. Waste of the short fibers in the gripped end portions of the butts is thus avoided. After the butt end portions of the plant parts have been rasped, and prior to the insertion of such portions between the jaws of the clamps, it is preferred that the exposed fibers be twisted, as illustrated in Figure 12, to form a round compacted stem 46a, the latter being inserted between and being gripped by a clamp while thus twisted. The twisting and gripping of the ends of the fibers in the manner described insures the holding of the individual fibers against lengthwise movement with respect to adjacent fibers. This has the advantage that the fibers in the thin longitudinal portions (such as the edges of leaves, for example) of the plant parts are held firmly and their loss, which might otherwise occur during the rasping and beating operations, is prevented.

Although the twisting of the fibers, which are to be gripped by the clamps, may be done by hand, means is provided for reducing to a minimum the time and effort required to perform this operation. The said means, as illustrated in Figures 8 and 10, includes a tubular element 85 which is rotatably supported by a bracket 86 above the top of the table in such relation to the rail 58 that as each clamp approaches the upper end of the latter one jaw moves over the element and the companion jaw moves under it. The twisting element is driven by a belt 87 (Figure 10); its axis is parallel with the upper run of the chain 47; and it is formed with a flaring entrance 88 which tapers to a reduced bore 89, the latter having an annular axial portion and communicating diametrically opposed longitudinally extending channels 90.

To twist the rasped end of a plant part the said end is inserted in the entrance of the element 85, the funnel-like wall of the entrance causing some of the fibers to enter the annular portion of the bore 89 and some of them to enter the channels 90. As the element 85 rotates the fibers which have entered the channels 90 leave the latter and are twisted around those which occupy the annular portion of the bore and together with the fibers originally occupying this portion of the bore are shaped into a stem of substantially round cross section, wherein the individual fibers, owing to their firm engagement with adjacent fibers, are securely held against relative lengthwise movement with respect to one another. While the fibers of the stem are so held the chain 47 moves one of the clamps 51 beyond the end of the cam rail 58 and the jaws of the clamp are released to firmly grip the stem adjacent the element 85 and withdraw the stem from the twisting element as the plant part is moved lengthwise to advance the free end in the direction of the rasping roll and plate.

I claim as my invention:

1. A decorticating machine of the character described including a pair of arcuate rasping plates, a concentric cooperating bladed rasping roll, a housing in which said plates and roll are mounted, said plates being arranged so that a radial plane touching the leading edge of one is substantially normal with respect to a similar plane touching the leading edge of the other and entrances at opposite sides of said housing through which the plant parts to be processed may be introduced for passage between said plates and roll.

2. A decorticating machine of the character described including a pair of arcuate rasping plates, a concentric cooperating bladed rasping roll, a housing in which said plates and roll are mounted, said plates being arranged at opposite ends of said roll and in such a manner that a radial plane touching the leading edge of one is substantially normal with respect to a similar plane touching the leading edge of the other and entrances at opposite sides of said housing through which the plant parts to be processed may be introduced for passage between said plates and roll.

3. A decorticating machine of the character described including a pair of arcuate rasping plates, a concentric cooperating bladed rasping roll, the blades of said roll being non-radial and arranged in pairs in such a manner that with respect to the direction of rotation of the roll the leading blade in each pair forms an acute angle with each rasping plate while the trailing blade forms an obtuse angle, whereby the former functions primarily as a crushing blade and the latter as a scraping blade, a housing in which said plates and roll are mounted, said plates being arranged at opposite ends of said roll and having an angular relation such that a radial plane touching the leading edge of one is substantially normal with respect to a similar plane touching the leading edge of the other and entrances at opposite sides of said housing through which the plant parts to be processed may be introduced for passage between said plates and roll.

4. A decorticating machine of the character described including cooperating rasping elements, a housing in which said elements are mounted, said housing having an entrance through which the plant parts to be processed may be introduced lengthwise for passage between said elements and a curtain of rubber or the like supported in front of said entrance for preventing juices which may be liberated from spraying upon the operator of the machine, said curtain being slit vertically to form independently movable strips which are yieldable in response to the width and thickness of the plant parts to permit the introduction of the latter into the machine.

5. A decorticating machine of the character described including an arcuate rasping plate, a concentric cooperating bladed rasping roll, and a table across which plant parts may be advanced lengthwise in the direction of the axis of said roll, the blades of said roll being mounted in such a manner that at the leading edge of said rasping plate certain of them form an acute angle with said plate and act primarily to crush the non-fibrous material of the plant parts while other of said blades form an obtuse angle with said plate and serve primarily to scrape such material from the fibers of said parts.

6. A decorticating machine of the character described including an arcuate rasping plate, a concentric cooperating bladed rasping roll, and a table across which plant parts may be advanced lengthwise in the direction of the axis of said roll, the blades of said roll cooperating in pairs and being mounted in such a manner that at the leading edge of said rasping plate the leading blade of each of said pairs forms an acute angle with said plate and acts primarily to crush the non-fibrous material of the plant parts while the trailing blade forms an obtuse angle with said plate and serves primarily to scrape such material from the fibers of said parts.

7. A decorticating machine of the character described including an arcuate rasping plate, a concentric cooperating bladed rasping roll, and a table across which plant parts may be advanced lengthwise in the direction of the axis of said roll, the blades of said roll cooperating in pairs and being mounted in such a manner that at the leading edge of said rasping plate the leading blade of each of said pairs forms an angle of the order of 75° with said plate and acts primarily to crush the non-fibrous material of the plant parts while the trailing blade forms an angle of the order of 105° with said plate and serves primarily to scrape such material from the fibers of said parts.

WALTER B. SIMONS